US006775647B1

(12) United States Patent
Evans et al.

(10) Patent No.: US 6,775,647 B1
(45) Date of Patent: Aug. 10, 2004

(54) METHOD AND SYSTEM FOR ESTIMATING MANUFACTURING COSTS

(75) Inventors: Jerry William Evans, Middletown, OH (US); Paul P. Mehta, Cincinnati, OH (US); Arthur L. Ludwig, Hamilton, OH (US)

(73) Assignee: American Technology & Services, Inc., Cincinnati, OH (US)

( * ) Notice: Subject to any disclaimer, the term of this patent is extended or adjusted under 35 U.S.C. 154(b) by 0 days.

(21) Appl. No.: 09/517,023

(22) Filed: Mar. 2, 2000

(51) Int. Cl.[7] .............................................. G06G 7/48
(52) U.S. Cl. .................... 703/7; 703/1; 703/2; 700/97
(58) Field of Search ...................... 703/1–2, 7; 700/97; 705/400; 345/420

(56) References Cited

U.S. PATENT DOCUMENTS

| | | | |
|---|---|---|---|
| 4,862,376 A | 8/1989 | Ferriter et al. .............. | 700/107 |
| 4,887,206 A | 12/1989 | Natarajan ..................... | 705/29 |
| 5,063,506 A | 11/1991 | Brockwell et al. ............ | 705/7 |
| 5,089,970 A | 2/1992 | Lee et al. ..................... | 700/96 |
| 5,109,337 A | 4/1992 | Ferriter et al. ............... | 705/29 |
| 5,189,606 A | 2/1993 | Burns et al. .................. | 705/10 |
| 5,249,120 A | 9/1993 | Foley ........................... | 705/1 |
| 5,255,207 A | 10/1993 | Cornwell ...................... | 703/1 |
| 5,268,838 A | 12/1993 | Ito ................................ | 700/99 |
| 5,521,814 A | 5/1996 | Teran et al. .................. | 700/266 |
| 5,546,564 A | 8/1996 | Horie ............................ | 703/1 |
| 5,576,965 A | 11/1996 | Akasaka et al. ............. | 700/97 |
| 5,655,087 A | 8/1997 | Hino et al. ................... | 705/29 |
| 5,717,595 A | 2/1998 | Cherrington et al. ....... | 705/400 |
| 5,737,227 A | 4/1998 | Greenfield et al. .......... | 705/400 |
| 5,748,943 A | 5/1998 | Kaepp et al. ................. | 703/1 |
| 5,793,632 A | 8/1998 | Fad et al. ..................... | 705/400 |
| 5,880,959 A | 3/1999 | Shah et al. ................... | 700/97 |
| 5,893,082 A | 4/1999 | McCormick ................. | 705/400 |
| 5,914,887 A | 6/1999 | Scepanovic et al. ......... | 716/8 |
| 6,037,945 A * | 3/2000 | Loveland ..................... | 345/420 |
| 6,157,900 A * | 12/2000 | Maseeh ......................... | 703/2 |

OTHER PUBLICATIONS

Leibl et al, "Cost Calculation with a Feature–based CAD System using Modules for Calculation, Comparison and Forecast", Journal of Engineering Design, vol. 10 No. 1, pp. 93–102 (Mar. 1999).*
Anderson et al, "Designing Quality into Products: The Use of Accounting Data in New Product Development", Accounting Horizons, vol. 12 No. 3, pp. 213–233 (Sep. 1998).*
Hertenstein et al, "Why Product Development Teams Need Management Accountants", Management Accounting, vol. 79 No. 10, pp. 50–55 (Apr. 1998).*
Veeramani et al, "Methodologies for Rapid and Effective Response to Requests for Quotation (RFQs)", IIE Transactions, vol. 29 No. 10, pp. 825–838 (Oct. 1997).*
*The PRICE Hardware Estimating Model*, Product Profile, Lockheed Martin.
*Determining the Affordability of Advanced Propulsion Systems*, Paul P. Mehta, Jerry W. Evans, Arthur L. Ludwig, Jun. 7–10, 1999.

* cited by examiner

Primary Examiner—Samuel Broda, Esq.
(74) Attorney, Agent, or Firm—Dinsmore & Shohl LLP

(57) ABSTRACT

A method and system estimates manufacturing costs for conventional and advanced materials and processes based on a process-oriented approach. A computer system comprises an input display for selecting one or more designs and one or more design parameters. Cost models are based upon process-oriented manufacturing cost estimates for a plurality of designs utilizing materials and manufacturing of processes. Software is programmed to receive selected designs and selected design parameters from the input display and pass the selected designs and design parameters to the cost models. An output display shows the manufacturing costs estimated by the cost models for the selected designs and design parameters. A manufacturing process flow simulation model highlights and quantifies the magnitude of the manufacturing process cost drivers.

11 Claims, 17 Drawing Sheets

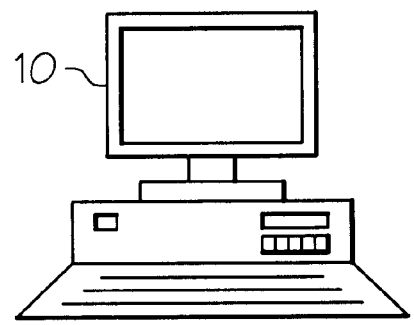
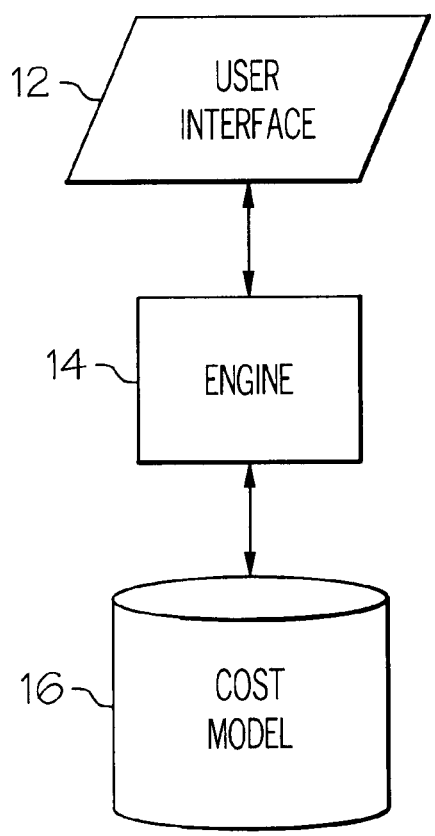
FIG. 1

Integrated OGV / Diffuser - Single passage

Two-piece, OGV Ring / Diffuser - Single passage

Integrated OGV / Diffuser - Tri-passage

Two-piece, OGV Ring / Diffuser - Tri-passage

Integrated OGV / Diffuser - Quad passage

Two-piece, OGV Ring / Diffuser - Quad passage

SHAFT FORGING

AREA = 20.1 SQ. IN.

C.G. = 7.6 IN. RAD.

VOL. = 1001.4 CU. IN.

WEIGHT = 137 LBS.

7.6"

Routing

File  Edit  Options  Data  Defaults  Window  Help 97-8

Part No. 97-8    Work Order

History Wednesday April 09 1997    Lot Size 10    Cost 40575.90153

| No | Workstation | Description | N | Setup Time | Run Time |
|----|-------------|-------------|---|------------|----------|
| 10 | GIDDINGS & LEWIS 30" | Turn LPT Shaft to sonic envelope dimensions | N | 0.7500 | 576.4497 |
| 20 | WORK BENCH -1 | Clean and Deburr shaft | | | 35.1633 |
| 25 | INSP STATION | Ultrasonic inspect forging | | 0.2500 | 24.9000 |
| 30 | GIDDINGS & LEWIS 30" | Turn LPT Shaft to finished coutour | | 0.9167 | 105.1298 |
| 35 | WORK BENCH -1 | Clean and Deburr disk | | | 33.0817 |
| 40 | MILICRON 15HC | Drill and Ream bolt circle (forward flange) | | 2.0833 | 25.0998 |
| 45 | MILICRON 15HC | Mill scallops in forward flange | | 1.2500 | 28.6234 |
| 47 | MILICRON 15HC | Drill and Ream bolt circle (aft flange) | | 2.0833 | 32.5198 |
| 50 | MILICRON 15HC | Mill scallops in forward flange | | 1.2500 | 28.6234 |
| 55 | WORK BENCH -1 | Clean and Deburr holes and scallops | | | 31.4533 |
| 60 | 155-13040-NOT | Flourescent Panetrant inspection | | 1.0000 | 2.3833 |
| 65 | HEAT TREAT | Heat Treat operation for stress relieve | | | 17.5000 |
| 70 | GRIT BLASTER -1 | Degrease and Grit Blast part after heat treating | | 0.2500 | 12.5817 |
| 80 | CMM -1 | Dimensional inspection | | 1.0000 | 38.1000 |
| 85 | CMM -1 | Eddy current inspection of part features | | 1.0000 | 21.6000 |
| | | | | 11.833 | 1021.1087 |

FIG. 11

| Process Opn No | Table Number | Process Description | Table Time | Adjustment Factor | Cycle Minutes | Setup Hours |
|---|---|---|---|---|---|---|
| 20.2 Deburr | 18.5.S | Setup (per part) | 0.05 | 1 | | 0.05 |
| | 1.1.1B | Sling, hoist, move | 3.38 | 1 | 3.38 | |
| | 18.5.1 | Handling, repos. | 0.38 | 8 | 3.04 | |
| | 18.5.2 | Tool handling | 0.03 | 8 | 0.24 | |
| | 18.5.4B | File edge | 1.50 | 30 | 45.00 | |
| | 18.5.6 | Blow-off | .26 | 6 | 1.56 | |
| | 18.5.1 | Handling, repos. | .38 | 8 | 3.04 | |
| | 18.5.8 | Sand / Hand Polish | 8.12 | 15 | 121.80 | |
| | 18.5.6 | Blow-off | 0.26 | 6 | 1.56 | |
| | 1.1.1B | Sling, hoist, move | 3.38 | 1 | 3.38 | |
| Total Lot Hours: | | 3.10 | | | 183.00 | 0.05 |

FIG. 13

Part Name: 11311 - Diffuser    WBS Number: 11311    Material: IN-718    Mat. Cost: $67,320
Input Mat. Form: Casting    Input Weight: 599    Finished Weight: 521.5    Service Cost: 0
Labor Rate: $25.69    Burden Rate: $77.07    Total Hours: 129.72    Variance: 20%    Lbr. Cost: $15,996.28
Unit: 250th in 2014    Year $: 1990    Lot Size: 10    *Total Manufacturing Cost:* $83,316.28

| Operation: Number | Description | Hrs. / Part |
|---|---|---|
| 10 | Finish Turn combuster burner | 17.66 |
| 20 | Clean and Deburr | 7.04 |
| 25 | Drill holes in aft inner flanges, 96 @ 0.34" dia. | 6.52 |
| 30 | Drill holes in outer flange, 90 @ 0.43" dia. | 4.70 |
| 35 | Drill holes in forward inner flange, 54 @ 0.25" dia. | 2.98 |
| 40 | Clean Diffuser | 1.60 |
| 45 | Deburr holes, 90@.43", 96@.34", and 54@.25" dia. | 2.59 |
| 50 | EDM slots for OGV's | 3.90 |
| 55 | Clean and Deburr slots | 9.05 |
| 60 | Fixture, Locate vanes, Apply alloy and Braze | 27.29 |
| 70 | Clean part & polish vanes at flowpath | 6.42 |
| 80 | Dimensional Inspect | 12.23 |
| 90 | Final Inspect. | 4.14 |
| 11249 | Outlet Guide Vanes - to braze in place | 23.60 |
| | | 0.00 |

FIG. 14

| Part Name | Finished Weight | Alloy | Casting Cost 1999 $ | Quantity multiplier | Total Input Material Cost 1999$ | Labor Hours | Total Manufacturing Cost 1999$ |
|---|---|---|---|---|---|---|---|
| Diffuser (integrated), Mod 1 | 450 | IN-718 | $ 50,000 | 1 | $ 50,000 | 110 | $ 63,814 |
| Diffuser (integrated), Mod 1 | 310 | TiAl | $ 100,000 | 1 | $ 100,000 | 160 | $ 119,980 |
| Diffuser (integrated), Mod 1 | 400 | IN-625 | $ 50,000 | 1 | $ 50,000 | 135 | $ 66,897 |
| Diffuser (integrated), Mod 3 | 175 | IN-718 | $ 35,000 | 1 | $ 35,000 | 126 | $ 50,638 |
| Diffuser (integrated), Mod 3 | 145 | TiAl | $ 65,000 | 1 | $ 65,000 | 115 | $ 79,282 |
| Diffuser (integrated), Mod 3 | 405 | IN-625 | $ 30,000 | 1 | $ 30,000 | 139 | $ 47,241 |
| Diffuser (integrated), Mod 4 | 250 | IN-718 | $ 35,000 | 1 | $ 35,000 | 150 | $ 53,598 |
| Diffuser (integrated), Mod 4 | 125 | TiAl | $ 75,000 | 1 | $ 75,000 | 120 | $ 89,897 |
| Diffuser (integrated), Mod 4 | 375 | IN-625 | $ 40,000 | 1 | $ 40,000 | 100 | $ 52,432 |
| Indv. varies | 45 | IN-718 | $ 100 | 150 | $ 15,000 | 31 | $ 18,823 |
| Indv. varies | 25 | TiAl | $ 200 | 150 | $ 30,000 | 31 | $ 33,823 |
| Indv. varies | 36 | IN-625 | $ 200 | 150 | $ 30,000 | 31 | $ 33,823 |
| Ingegrated OGV / Diffuser Assembly, Mod 1 | | IN-718 | $ 65,000 | 1 | $ 65,100 | 141 | $ 82,487 |
| Ingegrated OGV / Diffuser Assembly, Mod 1 | | TiAl | $ 130,000 | 1 | $ 130,100 | 191 | $ 153,653 |
| Ingegrated OGV / Diffuser Assembly, Mod 1 | | IN-625 | $ 80,000 | 1 | $ 80,100 | 166 | $ 100,570 |
| Ingegrated OGV / Diffuser Assembly, Mod 3 | | IN-718 | $ 50,000 | 1 | $ 50,100 | 157 | $ 69,460 |
| Ingegrated OGV / Diffuser Assembly, Mod 3 | | TiAl | $ 95,000 | 1 | $ 95,100 | 148 | $ 113,104 |
| Ingegrated OGV / Diffuser Assembly, Mod 3 | | IN-625 | $ 60,000 | 1 | $ 60,100 | 170 | $ 81,063 |
| Ingegrated OGV / Diffuser Assembly, Mod 4 | | IN-718 | $ 50,000 | 1 | $ 50,100 | 181 | $ 72,419 |
| Ingegrated OGV / Diffuser Assembly, Mod 4 | | TiAl | $ 105,000 | 1 | $ 105,100 | 151 | $ 123,720 |
| Ingegrated OGV / Diffuser Assembly, Mod 4 | | IN-625 | $ 70,000 | 1 | $ 70,100 | 131 | $ 86,254 |

FIG. 15

| Part Name | Finished Weight | Alloy | Total Input Material Cost 1999$ | Labor Hours | Total Manufacturing Cost 1999$ |
|---|---|---|---|---|---|
| Forward Segment, Mod 1 | 250 | IN-718 | $ 18,750 | 35 | $ 23,066 |
| Forward Segment | 175 | IN-718 | $ 39,375 | 75 | $ 48,623 |
| Forward Segment | 380 | TiAl | $ 13,300 | 40 | $ 18,232 |
| Aft Segment, Mod 1 | 210 | IN-718 | $ 15,750 | 30 | $ 19,449 |
| Aft Segment | 105 | TiAl | $ 23,625 | 20 | $ 26,091 |
| Aft Segment | 120 | IN-625 | $ 4,200 | 40 | $ 9,132 |
| Diffuser (2-piece), Mod 1 | 460 | IN-718 | $ 34,500 | 36 | $ 46,955 |
| Diffuser (2-piece), Mod 1 | 280 | TiAl | $ 63,000 | 25 | $ 77,797 |
| Diffuser (2-piece), Mod 1 | 500 | IN-625 | $ 17,500 | 37 | $ 31,928 |
| Forward Segment, Mod 3 | 210 | IN-718 | $ 15,750 | 50 | $ 21,916 |
| Forward Segment | 125 | IN-718 | $ 28,125 | 30 | $ 31,824 |
| Forward Segment | 275 | TiAl | $ 9,625 | 27 | $ 12,954 |
| Aft Segment, Mod 3 | 48 | IN-718 | $ 3,600 | 32 | $ 7,546 |
| Aft Segment | 120 | TiAl | $ 24,000 | 45 | $ 29,549 |
| Aft Segment | 150 | IN-625 | $ 5,250 | 75 | $ 14,498 |
| Diffuser (2-piece), Mod 3 | 258 | IN-718 | $ 19,350 | 56 | $ 36,367 |
| Diffuser (2-piece), Mod 3 | 245 | TiAl | $ 52,125 | 10 | $ 62,607 |
| Diffuser (2-piece), Mod 3 | 425 | IN-625 | $ 14,875 | 8 | $ 28,410 |
| Forward Segment, Mod 4 | 300 | IN-718 | $ 16,073 | 60 | $ 23,472 |
| Forward Segment | 110 | TIAl | $ 22,635 | 45 | $ 28,184 |
| Forward Segment | 175 | IN-625 | $ 7,683 | 30 | $ 11,382 |
| Aft Segment, Mod 4 | 50 | IN-718 | $ 7,703 | 35 | $ 12,019 |
| Aft Segment | 85 | TiAl | $ 10,709 | 25 | $ 13,792 |
| Aft Segment | 120 | IN-625 | $ 2,679 | 15 | $ 4,529 |
| Diffuser (2-piece), Mod 4 | 350 | IN-718 | $ 23,776 | 15 | $ 37,340 |
| Diffuser (2-piece), Mod 4 | 195 | TiAl | $ 33,344 | 15 | $ 43,826 |
| Diffuser (2-piece), Mod 4 | 295 | IN-625 | $ 10,362 | 15 | $ 17,761 |
| Outlet Guide Vane, Complete Ring | 75 | IN-718 | $ 3,053 | 25 | $ 6,136 |
| Outlet Guide Vane, Complete Ring | 55 | TiAl | $ 4275 | 25 | $ 7,358 |
| Outlet Guide Vane, Complete Ring | 62 | IN-625 | $ 1,556 | 25 | $ 4,639 |
| OGV Ring / Diffuser Assembly, Mod. 1 | 535 | IN-718 | $ 37,553 | 126 | $ 53,090 |
| OGV Ring / Diffuser Assembly, Mod. 1 | 335 | TiAl | $ 67,275 | 145 | $ 85,155 |
| OGV Ring / Diffuser Assembly, Mod. 1 | 562 | IN-625 | $ 19,056 | 142 | $ 36,566 |
| OGV Ring / Diffuser Assembly, Mod. 3 | 333 | IN-718 | $ 22,403 | 163 | $ 42,503 |
| OGV Ring / Diffuser Assembly, Mod. 3 | 300 | TiAl | $ 56,400 | 110 | $ 69,964 |
| OGV Ring / Diffuser Assembly, Mod. 3 | 487 | IN-625 | $ 16,431 | 135 | $ 33,049 |
| OGV Ring / Diffuser Assembly, Mod. 4 | 425 | IN-718 | $ 26,829 | 135 | $ 43,476 |
| OGV Ring / Diffuser Assembly, Mod. 4 | 250 | TiAl | $ 37,619 | 110 | $ 51,183 |
| OGV Ring / Diffuser Assembly, Mod. 4 | 357 | IN-625 | $ 11,918 | 85 | $ 22,400 |

FIG. 16

Engine Cost Assessment Program

Part Name: <u>Integrated Diffuser</u>

Input Material Form: <u>Casting</u>

Input Material Parameters

Material: IN-718
    Input weight: 350 lb

Finished Part Parameters

Design: One Piece
    Number of Passages: 4
    Max. Outer Diameter: 36.00 in
    Axial Length: 15.00 in
    Finished Weight: 250.00 lb

---

Manufacturing Cost Output for 250th Part (in 1999 Dollars)

| | | |
|---|---|---|
| Material Cost: | | $50,000.00 |
| Labor Cost: | | $22,419.00 |
|   Labor Hours: | 150.00 | |
|   Labor Rate: | $25.69/ hr | |
|   Burden Rate: | $77.07/ hr | |
|   Variance: | 20 % | |
| Manufacturing Cost: | | $72,419.00 |

FIG. 21

METHOD AND SYSTEM FOR ESTIMATING MANUFACTURING COSTS

COPYRIGHTS PRESERVED

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the design and manufacturing of parts, and will be specifically disclosed as a method and system for estimating manufacturing costs during the early design stage.

BACKGROUND OF THE INVENTION

No technology currently exists that successfully connects design engineering with production technology, especially in the area of advanced materials and processes. Design engineers do not have any automated way to evaluate the cost of producing parts or components they design. Normally, a manufacturing engineer has to conduct a cost evaluation as a separate exercise. In the absence of manufacturing data on materials and processes, the engineer normally uses a complexity factor on an older part performing the same or similar function. This technique is arbitrary, lacking a scientific basis for estimating cost. Some computer programs, such as PriceH (a commercially available system from Lockheed-Martin) and Compeat (proprietary to General Electric Aircraft Engines "GEAE"), exist and are based on comparative/parametric estimating, requiring historical data. However, such approaches are deficient for advanced materials and processes where there is little or no historical data, or where the historical data is drastically different than the desired materials or processes. Moreover, manufacturing data on advanced materials and processes is hard to find, and the limited data available is often misleading if projected to maturity without manufacturing technology assessment. Furthermore, the above programs do not successfully link with the knowledge base of design engineering, making them awkward to use. Since the prior techniques for estimating costs are often deficient, engineers typically ignore the eventual cost of manufacturing, leaving it for the production department to control the cost.

SUMMARY OF THE INVENTION

Accordingly, an object of the invention is to provide a method and system of estimating manufacturing costs aimed primarily at, but not limited to, the design community. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a computer system. An input display is adapted for selecting one or more designs and one or more design parameters. One or more cost models are based upon process-oriented manufacturing cost estimates for a plurality of designs utilizing advanced materials or processes. The cost models are operative to estimate manufacturing costs. Software is programed to receive selected designs and selected design parameters from the input display and pass the selected designs and design parameters to the cost models. An output display shows the manufacturing costs estimated by the cost model for the selected designs and design parameters.

Another aspect of the present invention is a method for estimating the manufacturing costs for a part design. A part design having advanced hardware is received. The manufacturing cost for the part design is estimated using a process-oriented approach. Using this method, the cost impact for a part design can be assessed. The manufacturing cost for part design is estimated. The part design configuration, dimensions, and/or materials are varied to result in a new part design, for which the manufacturing costs are estimated. By repeating this step, one can determine the cost impact by varying the part design.

Yet another aspect of the present invention is the method for modeling the manufacturing costs for a part design. A cost model domain is determined. A database is generated of process oriented manufacturing cost estimates based upon at least material costs, a viable manufacturing sequence having a plurality of operations, and the costs per operation. The database of cost estimates are categorized in accordance with the model domain. One or more cost model algorithms are built based on the database of cost estimates wherein cost is a function of parametric values. One or more parametric values describing the part design is then determined. The parametric values are input to the one or more cost model algorithms. The manufacturing cost for the part design is then estimated based upon the results from the cost model algorithms.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings:

FIG. 1 illustrates a computer system to estimate the manufacturing costs for a part design.

FIGS. 11–12 illustrates screen shots from the MetCAPP software.

FIG. 13 depicts a cost element breakdown for a manual operation.

FIG. 14 depicts a report summarizing material and operation costs.

FIGS. 15–16 illustrate examples of databases of manufacturing cost estimates.

FIG. 21 depicts a detailed cost output report.

DETAILED DESCRIPTION

Figure 2:
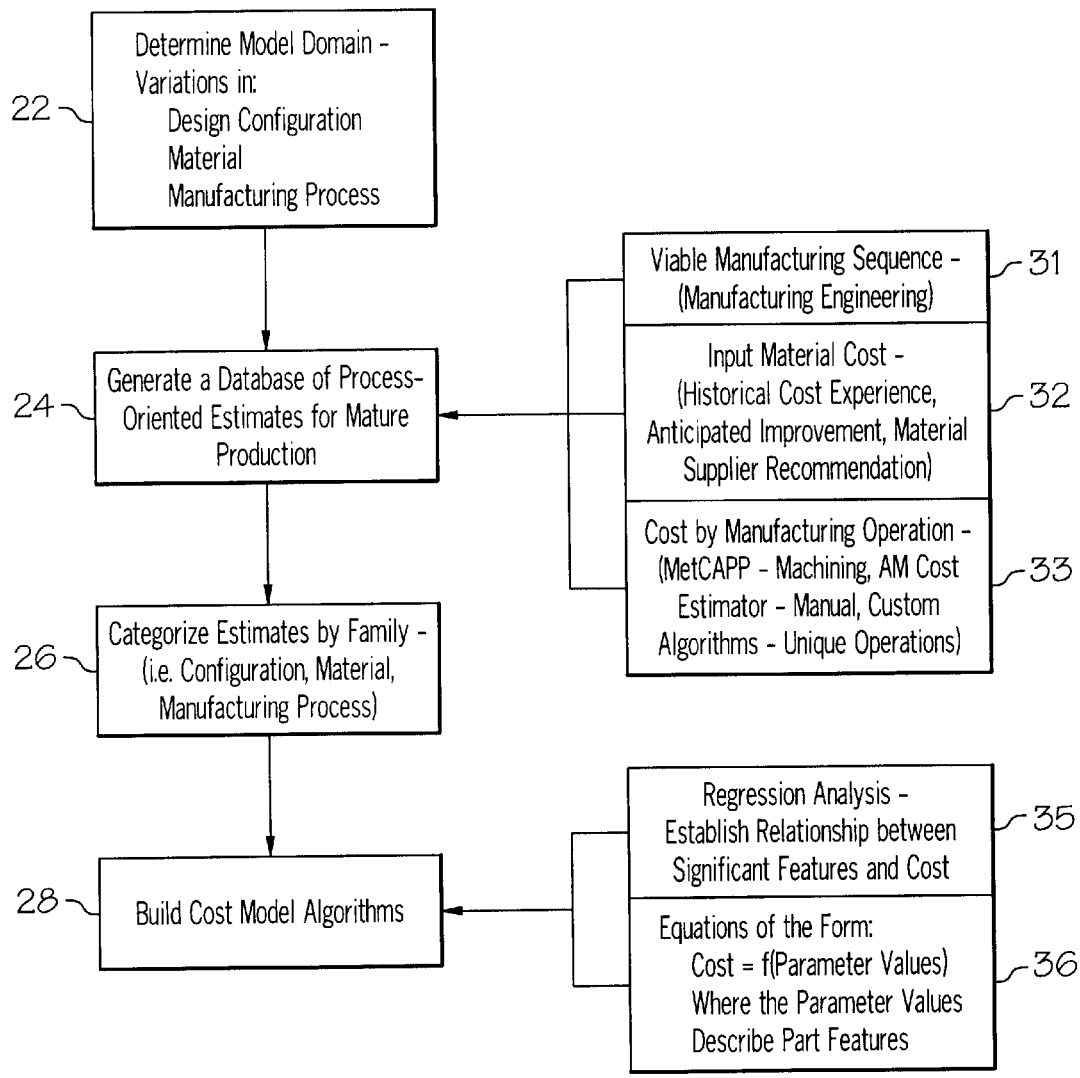
FIG. 2 illustrates one process for generating a cost model.

Reference will now be made to the present preferred embodiment of the invention, an example of which is illustrated in the accompanying drawings, wherein like numerals indicate the same element throughout the views. FIG. 1 illustrates one embodiment of a computer system 10 programmed to estimate the costs for a part design having advanced materials and/or processes using a process-oriented approach. As used herein, "advanced materials and/or processes" (which may also be referred to as "advanced hardware") refers to materials and processes used for manufacturing a part for which little or no historical manufacturing cost data is available in conjunction with that part. For instance, progressive, cutting edge and/or conceptual materials and/or processes which have yet to be used extensively, if at all, for manufacturing are considered "new" advanced materials and/or processes. Likewise, materials and processes that are old, but have not been extensively used in conjunction with a particular part are considered "old" advanced materials and/or processes. Advanced materials and processes are typically used in high technology applications (i.e. technology involving highly complex or specialized systems or devices), and are often used in conjunction with aerospace applications, such as aircraft engines. Nevertheless, advanced materials and processes can be implemented to manufacture any part. As used herein, "process-oriented" refers to a methodology based on a logical sequence of manufacturing steps.

The computer system 10 can be any conventional or special purpose computer, such as a desktop computer, a tower computer, a micro-computer, a mini-computer, server, workstation, palmtop computer, notebook computer, or the like. A computer readable medium (not explicitly shown) stores information readable by the computer system 10, such as programs, data files, etc. As one with ordinary skill in the art will readily appreciate, a computer readable medium can take a variety of forms, including magnetic storage (such as hard drives, floppy diskettes, tape, etc.), optical storage (such as laser disks, compact disks, digital video disks "DVD", etc.), electronic storage (such as random access memory "RAM", read only memory "ROM", programmable read only memory "PROM", flash memory, memory sticks, etc.), and the like. Some types of computer readable media, which are sometimes described as being non-volatile, can retain data in the absence of power so that the information is available when power is restored.

The computer system 10 includes a cost model 16 developed for different designs employing a process-oriented approach for estimating manufacturing costs. The cost model 16 may be employed as discrete points stored in a database or converted into algorithms to predict or project the cost as a function of the physical parameters of a part. Preferably, the cost model 16 is developed for a family of parts taking similarities in design, materials, and manufacturing techniques into consideration for defining the family. The cost model 16 translates part feature information from the design into manufacturing cost based on operations required to produce the feature.

A software engine 14 implements the cost model 16, either as separate program modules or as an integral program module. The engine 14 is directed by an appropriate user interface 12, preferably tailored to the knowledge base of a design engineer using the program early in the design cycle, thereby enabling the design community to evaluate manufacturing cost while other design studies are underway. This is a desirable time for addressing affordability and producibility issues while the engineering team is evaluating various materials and design configurations to meet performance objectives. Accordingly, trade studies between alternate designs, materials and/or processes will be enhanced by considering their impact on manufacturing cost. Based on inputs from the user interface 12, the engine 14 references the cost model 16 to predict the cost of a design part in various configurations utilizing advanced materials and/or processes. The modular structure of the computer system 10 facilitates updates to incorporate additional designs or advanced materials and/or processes for the subject part. Beyond this example, the computer system 10 can take alternative forms. For instance, the engine 14 can be made internet accessible by writing Active Server Pages (ASP) or Common Gateway Interface (CGI) where the user, remotely located, can access the program from the server, through internet/intranet and receive output/results in 'html' form.

While the cost model 16 can be generated in a variety of different ways, FIG. 2 illustrates one embodiment of a process 20 for generating a cost model, which in this example takes the form of a plurality of cost model algorithms. At step 22, a model domain is determined. This step establishes the range of possible variations to be covered by the cost model. These are variations that impact the cost of the part consisting of different configurations and designs, alternative materials, and possibly different methods of manufacturing the part. Designs that fall outside of the domain require a different set of cost algorithms for adequate assessment of manufacturing cost.

At step 24, a database of cost estimates is generated. Since little or no historical cost data is available for the part using advanced materials and/or processes, the cost model 16 is preferably derived from a set of discrete point estimates. These point estimates represent the variations identified in step 22. The estimates are created using a process-oriented approach by evaluating the labor or process hours required for each significant operation in the manufacturing process. Therefore the manufacturing engineer at this step maps the part features into their associated manufacturing processes.

A variety of steps and variables are used to create the point estimates. As illustrated in the present example, at step 31 a viable sequence of operations for manufacturing the part as a production item is determined. This can comprise knowledge from manufacturing engineering, previous experience, and assumptions and expectations about advanced processes currently under development. At step 32, the type of input material and its form is established (i.e., cast, forged, fabricated from mill products, or a composite). The costs for advanced materials are projected based on previous experience, potential for cost reductions in the materials manufacturing process, and anticipated cost improvements identified by the advanced material supplier. At step 33, a cost estimate is calculated for each manufacturing operation using analysis tools, such as the MetCAPP software for machining operations and the American Machinist Cost Estimator algorithms and data for other manual operations. For advanced processes, a custom algorithm can be developed from the limited data available and techniques such as Methods-Time-Measurement (MTM). This is accomplished by breaking down the manufacturing operation into cost elements that can be related to other operations or assessed from predetermined time standards. Predetermined time standards such as MTM assign a unit of time to each movement made by an operator during execution of one step in the manufacturing process.

Estimates are categorized by family at step 26. This enables a group technology approach that combines models for different parts. Each family is further subdivided into categories having the same manufacturing process to permit the models developed to be closely aligned with the designs to be estimated. For example, consider the components in aircraft engines. The family designation identifies a particular type of aircraft engine component such as blade, vane, case, etc. Categories within a family are divided by the manufacturing process that depends on the type of material, (e.g., ceramic matrix composite, metal matrix composite). For the example given in FIG. 3, the family would be; "Outlet Guide Vane, Diffuse". The categories in steps 42 through 46 provide enough definition of the part to be estimated to allow selection of the appropriate cost model algorithms at the bottom of the decision tree structure.

At step 28, cost model algorithms are built. The equations in the cost model 16 relate specific part features to cost. These equations are derived through statistical curve fitting of the discrete point estimates. As illustrated by step 35, the form of the equation may be linear as developed using multi-linear regression analysis or non-linear, having an exponential form or a polynomial consisting of a power series. As illustrated by step 36, the resulting cost estimate may then be calculated as a function of parameters that describe the part features. A simple example of a single parameter non-linear equation to establish the relationship between cost and the size of the part as measured by the outside diameter has the following form:

$$Y = A * X^b \text{ where:}$$

A is a constant from regression analysis,
b is a constant from regression analysis,
X is the parameter (e.g., maximum outside diameter of the part to estimate), and
Y is the estimated cost for the new part.

Figure 3:
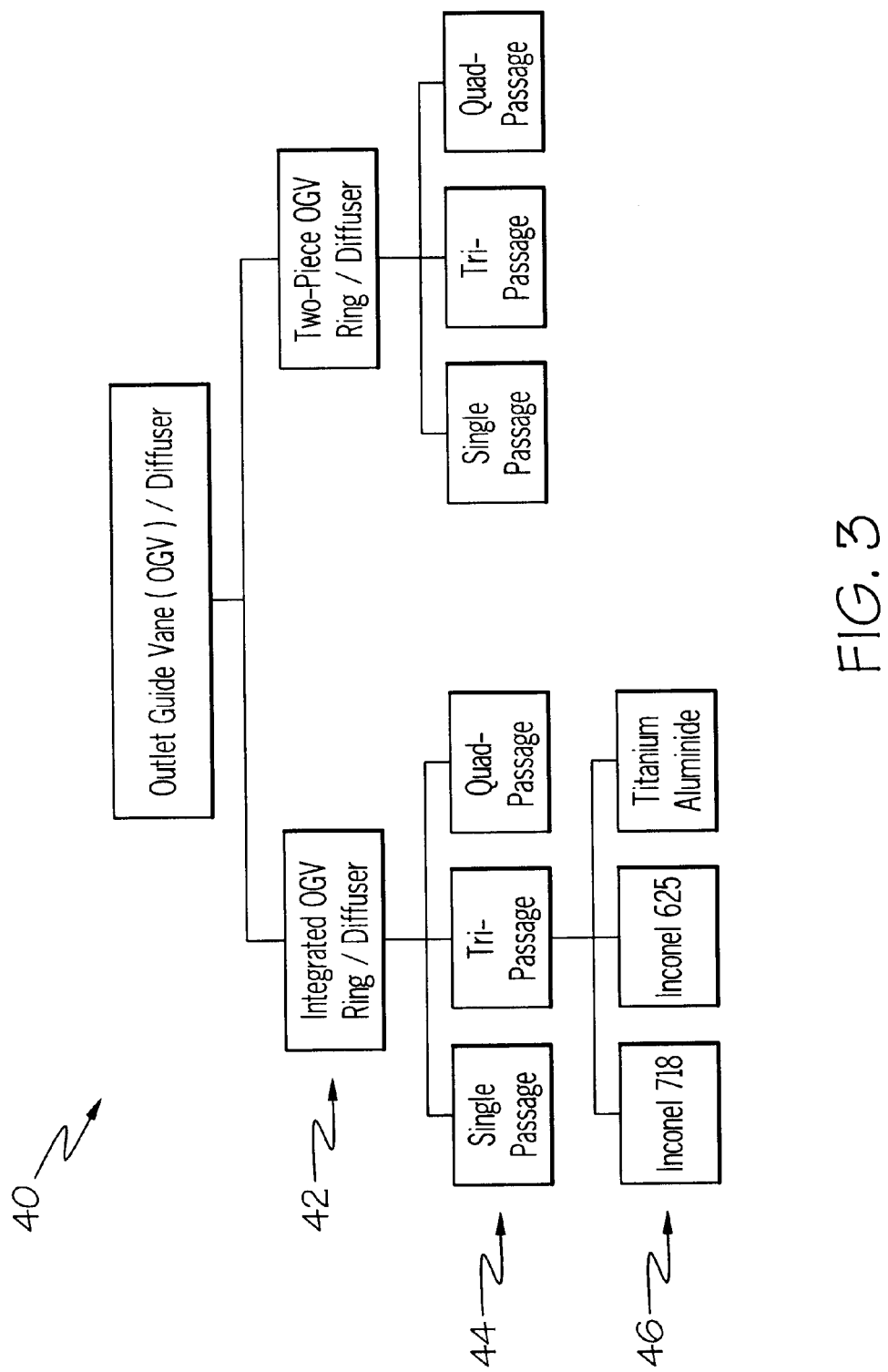
FIG. 3 illustrates an example of a model domain.
Figure 4:
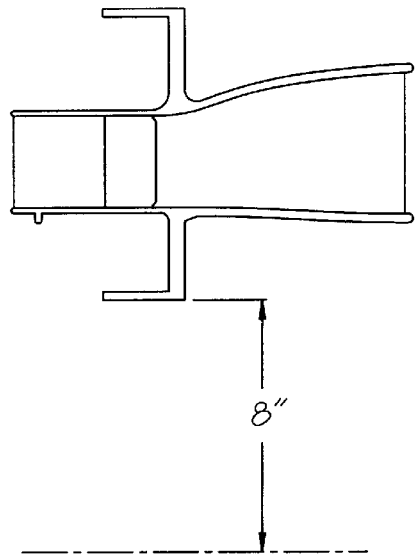
FIGS. 4–9 depicts six examples of design configurations.
Figure 7:
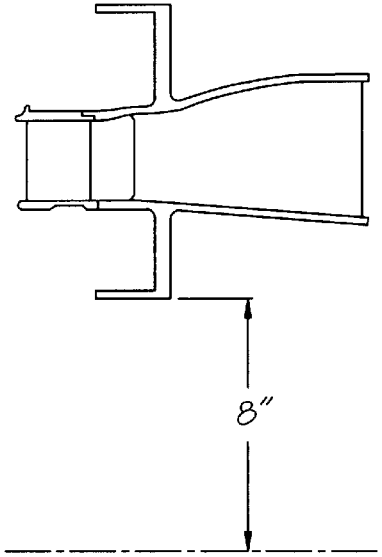
Figure 5:
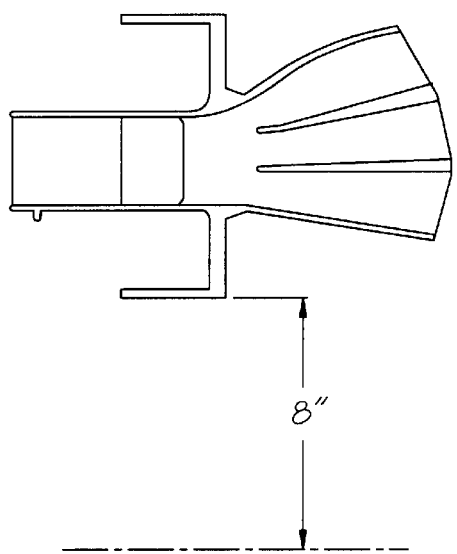
Figure 8:
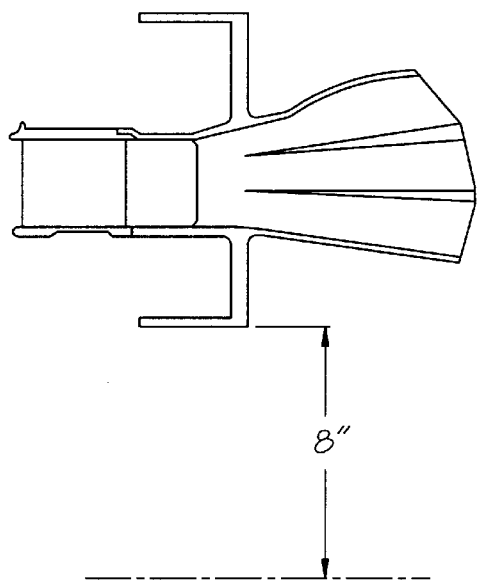
Figure 6:
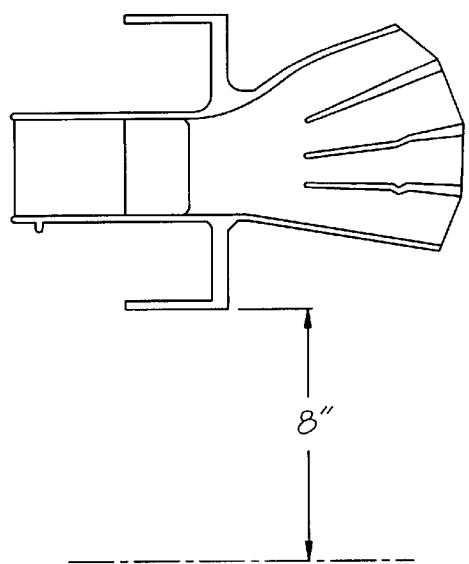
Figure 9:
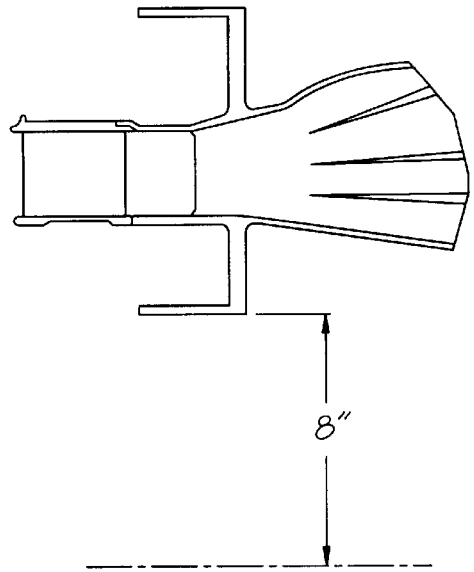

Consider the following example of generating a cost model 16 for a diffuser family in an aircraft engine. This example focuses on a hypothetical outlet guide vane (OGV)/diffuser assembly. As illustrated in FIG. 3, a model domain 40 is defined by the various designs represented in 42 through 46. In this example, the model domain comprises two alternate design variations 42, each having three design configurations 44, and three material applications 46. While not explicitly shown, the three material applications 46 apply to each of the six design configurations 44 (i.e., three configurations 44 for the two design variations 42).

After the model domain is defined, process-oriented estimates are developed for a plurality of discrete points, which in this example comprises eighteen design points (i.e., three material applications 46 for each of the six configurations 44). FIGS. 4–9 illustrate sketches of the six configurations 44, for which discrete costs estimates will be calculated. The material selection will not result in a change in the physical dimensions of the part for this example. Only the weight (finished and casting input) was adjusted as a function of material density for each discrete point. For each of the two design variations 42, the manufacturing process is similar. The parts that make up the OGV/diffuser assembly are made from an investment casting, finish turned, and assembled by welding or brazing. Therefore, no alternate manufacturing processes are considered in this cost model.

Figure 10:
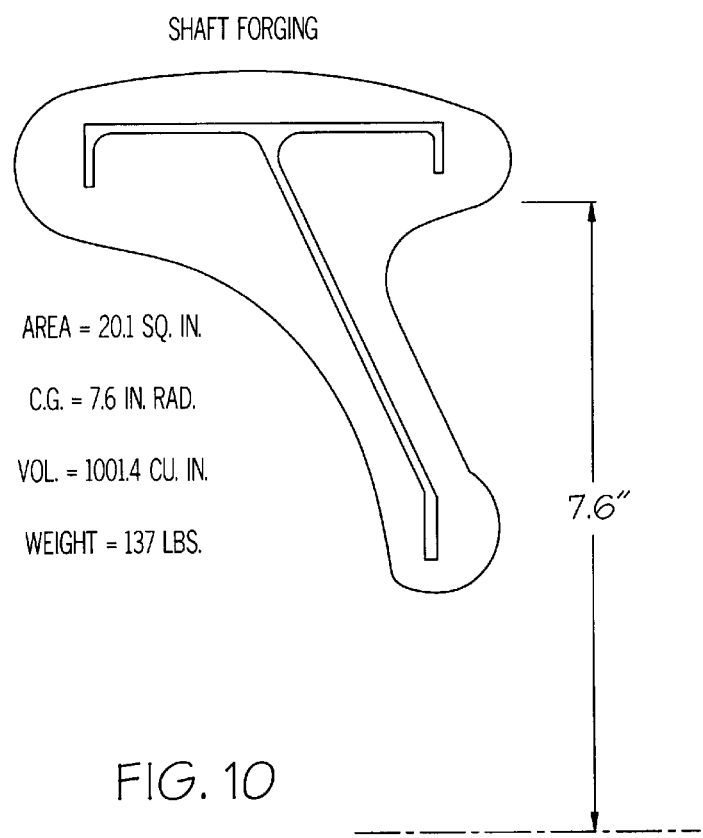
FIG. 10 depicts an example of a forging envelope.

The manufacturing cost for each configuration 44 of the two possible design variations 42 in the three material selections 46 (18 points) is estimated utilizing a process-oriented approach. A typical production-casting material allowance is added for each configuration 44. Using an appropriate CAD tool, such as the AutoCAD system, the cross-section area for the finished part is measured and the center of gravity determined. From these values, the volume and weight of the casting and the finished part are calculated. As an example, FIG. 10 depicts a forging envelope and mass properties for the design of a shaft. The shaft is machined from a forging instead of a casting, however, except for the input material cost calculation, the same technique is used to estimate the cost of the manufacturing operations to finish the part. The input material cost for the castings is then estimated using any appropriate casting cost model. Preferably, the casting model calculates manufacturing cost for the castings as a function of the material selected, the pour weight of the casting, the price of the virgin ingot material, and a number of other casting process parameters.

The next step in the estimating process is to determine the sequence of manufacturing operations required in manufacturing the specific part and generating features, such as boltholes, scallops in flanges, and the like. The process cost estimate for finishing the castings, which are assembled and welded or brazed together to complete the OGV ring/diffuse assembly is calculated, preferably utilizing a software tool such as the MetCAPP system. MetCAPP is a commercially available PC-compatible software program for "Knowledge-Based Process Planning" developed by the Institute of Advanced Manufacturing Sciences (IAMS). Embedded in the MetCAPP software is a comprehensive machining database known as CUTDATA which represents the industry standard database as published in the Machining Data Handbook. MetCAPP can be used to estimate cost for machining operations and to generate the summary report for the process-oriented estimates.

Figure 12:
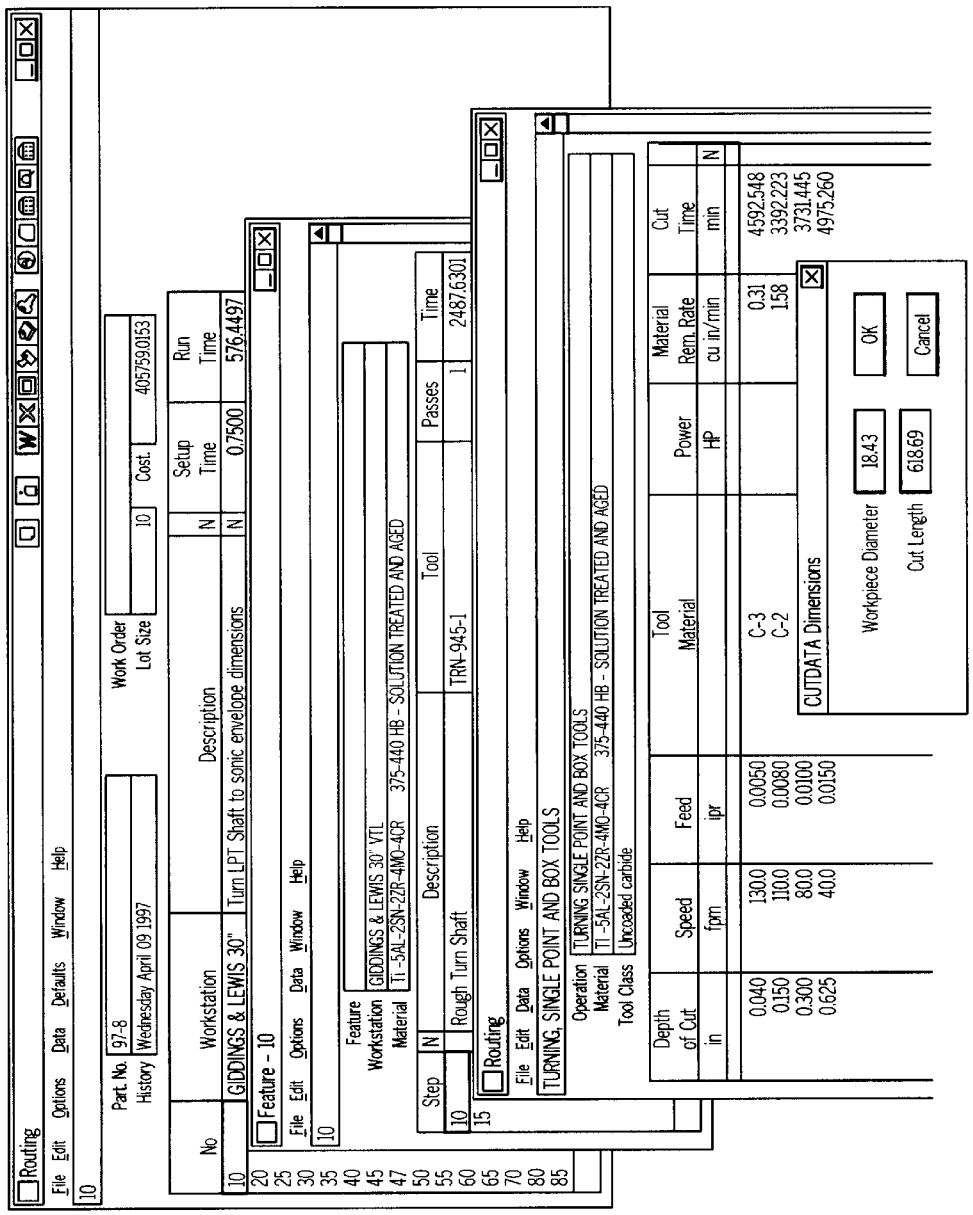

FIGS. 11 and 12 illustrate screen shots from the MetCAPP software. FIG. 11 depicts the estimated times for a sequence of manufacturing operations calculated by MetCAPP or input from other sources. A lot size of ten units is assumed to amortize the lot set-up time given in the first column after the operation description. Typically, MetCAPP time elements corresponding to the selected workstation for each operation provides this set-up time. The first operation (No. 10) is a turning operation based on the MetCAPP data as illustrated in FIG. 12. The cut time is calculated based on the input values for workpiece diameter and cut length. Cut length is a calculated value based on the depth of cut for the rough turning operation and the weight of material removed. The values for "Speed" in surface ft./min. and "Feed" in inches/rev. were based on information collected from industry sources with experience in machining TiAl.

Preferably, manual calculations or a manual operations software package other than MetCAPP is used to estimate times for manual operations such as cleaning, deburring, fixturing, brazing, and the like. For instance, the manual operations software can be a PC-compatible system having a cost estimating database consisting of labor estimating data and some process times. Further, the manual operations software preferably provides for estimating at a very detailed level, thus permitting an entirely new operation to be broken down into time elements for which data is available and then summed up to yield an estimate for the complete operation. The manufacturing operations can be totaled in the MetCAPP system even when the labor or processing time is based on another source.

Consider, for instance, the steps for the deburring operation depicted in FIG. 13. This elemental cost breakdown provides a basis for analyzing manual operations and new operations required for advanced technology materials and processes. When a software model is used to estimate the costs of such operations, the input and time required for generating a process-oriented estimate is minimized compared to manual estimations. For the present example of a deburring operation, the input parameters are reduced to: 1) maximum diameter to deburr, 2) number of diameters to deburr, and 3) part size (e.g., height, width, and length).

The steps outlined above are followed in similar fashion for each operation in the manufacturing sequence. The completed totals are then compiled to generate a report, such as that shown in FIG. 14. This output provides a summary of the material and labor cost used in the database summarized in FIGS. 15 and 16. FIG. 15 contains the (nine discrete) points for the integrated OGV/diffuse assembly, and FIG. 16 contains the points for the two-piece, OGV ring/diffuse assembly.

A cost model 16 is then built from a process-oriented foundation using regression analysis techniques based on the eighteen points in the database. For each possible selection, the cost is assembled as a summation of the appropriate database values. The size associated with the design points is the nominal size of the parts, preferably allowing a variation from this nominal size (e.g., +/−20%) utilizing a power curve equation for diffuser cost as a function of diameter. A similar algorithm also adjusts the part weight as a function of the diameter. Accordingly, a process-oriented approach is used to generate a cost model 16 for a family of parts.

Figure 17:
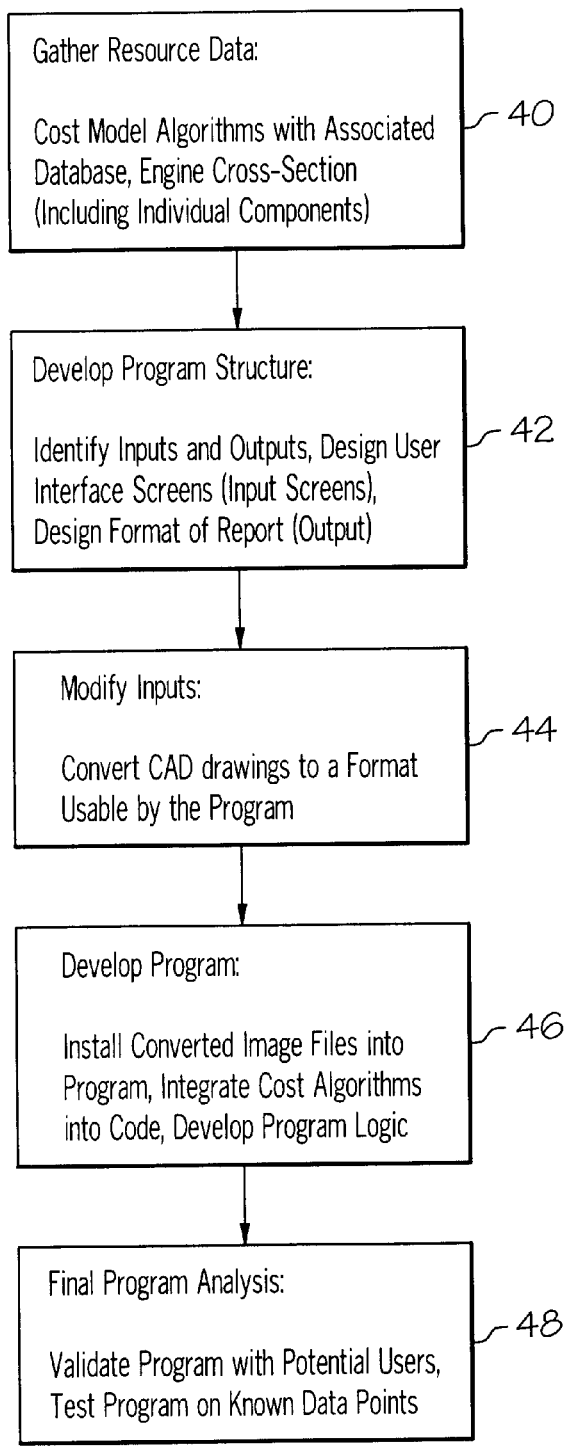
FIG. 17 depicts a flow chart for developing the software engine.

Returning to FIG. 1, the software engine 14 and corresponding user interface 12 can be made in any one of a variety of different ways. FIG. 17 illustrates one embodiment. At step 40, resource data is gathered, including input data such as the cost model algorithms, the associated database, CAD files for a complete engine and individual components. At step 42, the program structure is developed, including the internal data configuration (i.e., input and output variables), the user interface or input screens, and output formats and reports to generate. Next, at step 44 the input data is modified, such as converting CAD drawings to the program format. During step 46, the program is developed, which can be written in the Visual Basic, C++, or JAVA programming language, including the installing the converted image files, integrating the cost model, developing program logic, and the like. At step 48, the program is validated with potential users and program results tested for known data points. The end result is a cost analysis tool in the form of a software program. This program combines a graphical user interface with input and output controls to allow a user to quickly generate an estimate of a new part.

By way of example, one embodiment of a computer system 10 will now be illustrated. In this example, the target user for this program is a preliminary or conceptual design engineer. This program will permit a designer to enter basic information regarding the specific design for a part in the OGV/diffuser family followed by values for physical parameters that impact the manufacturing cost of the part. The input parameters are those which are typically available in the initial stages of the design cycle.

Figure 18:
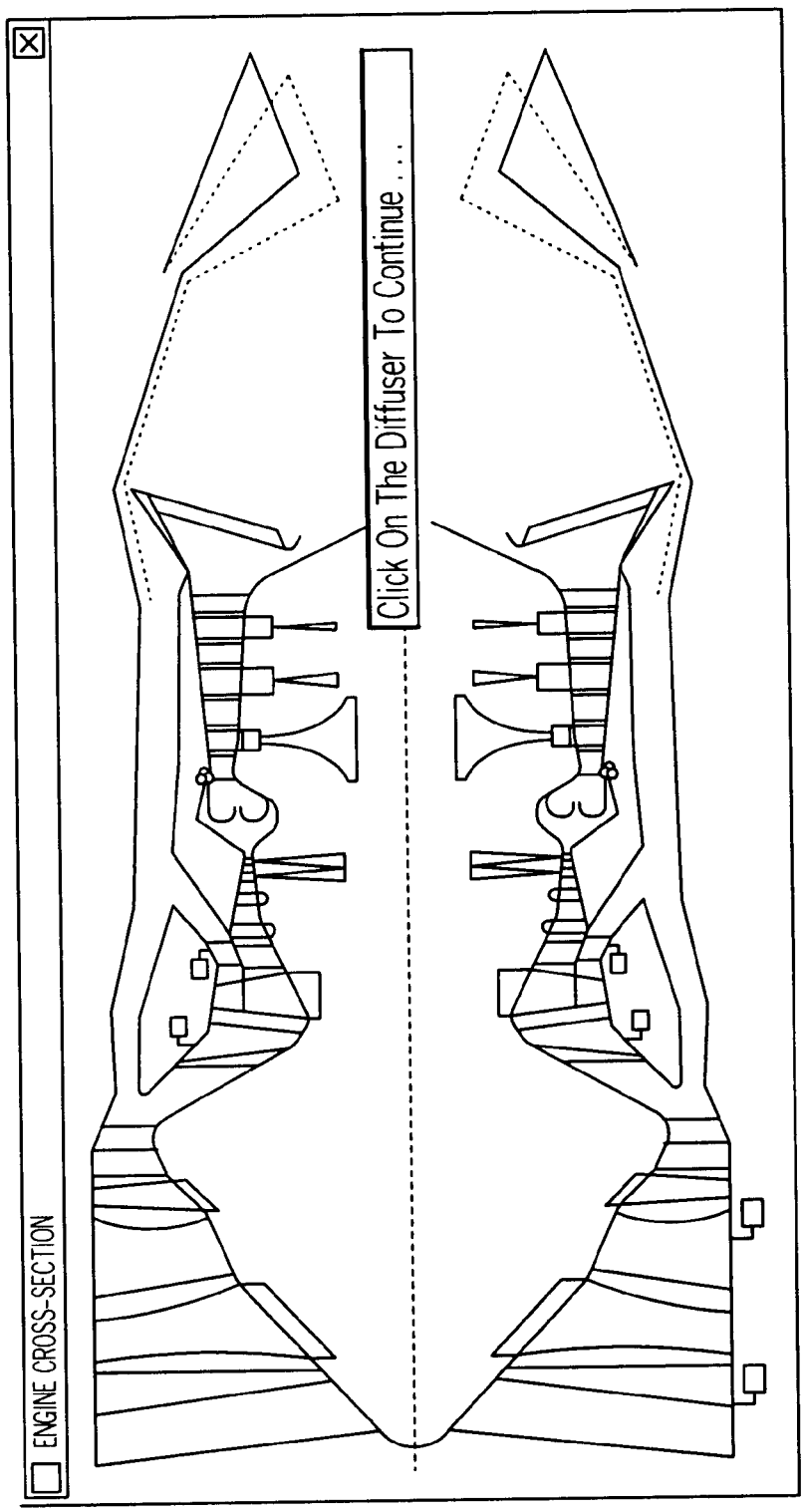
FIGS. 18–20 depicts screen shots from a user interface.
Figure 19:
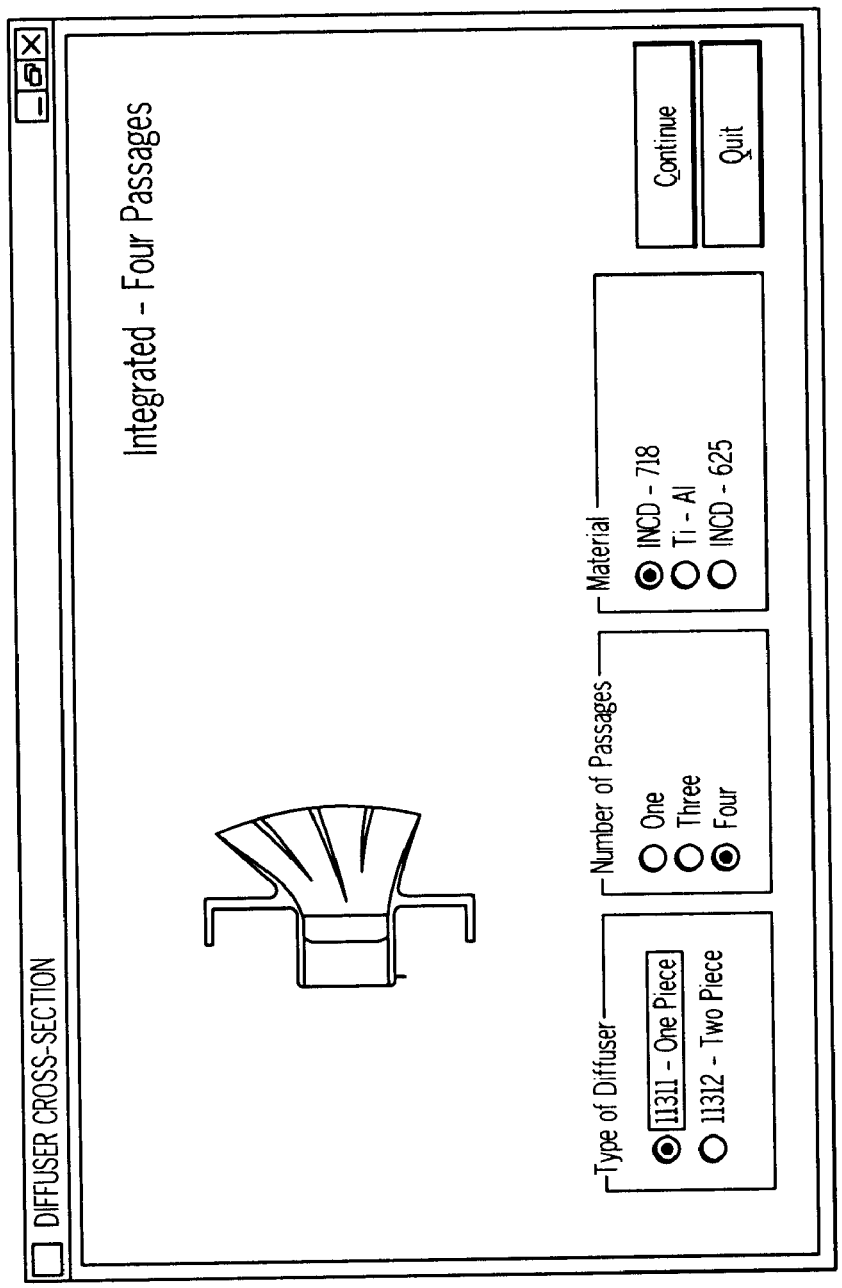

After an initial start-up screen, the program presents a sketch of the cross-section of an engine production configuration, such as the screen shot depicted in FIG. 18. The parts or modules modeled in the program are highlighted. Color-coding is used to quickly identify individual items in the engine. For instance, the diffuser can be highlighted in red. This indicates that this sub-component is available for cost estimation. After selecting the OGV/diffuser part from the cross-section, the user makes appropriate choices to identify the nominal design point to estimate. The screen shown in FIG. 19 allows the user to identify the design variation, configuration and material for a part to be estimated. In this example, the design variation may be either a one-piece integrated OGV/diffuser assembly or a two-piece diffuser assembly with a separate OGV ring. To define the configuration, the number of passages in the diffuser (i.e., one, three, or four) is specified. As these selections are made, the sketch shown on this screen will update automatically to reflect the choices. Finally the material may be specified from three alternatives (IN-718, TiAl, or IN-625). These parameters enable manufacturing cost calculation from the appropriate algorithms.

Figure 20:
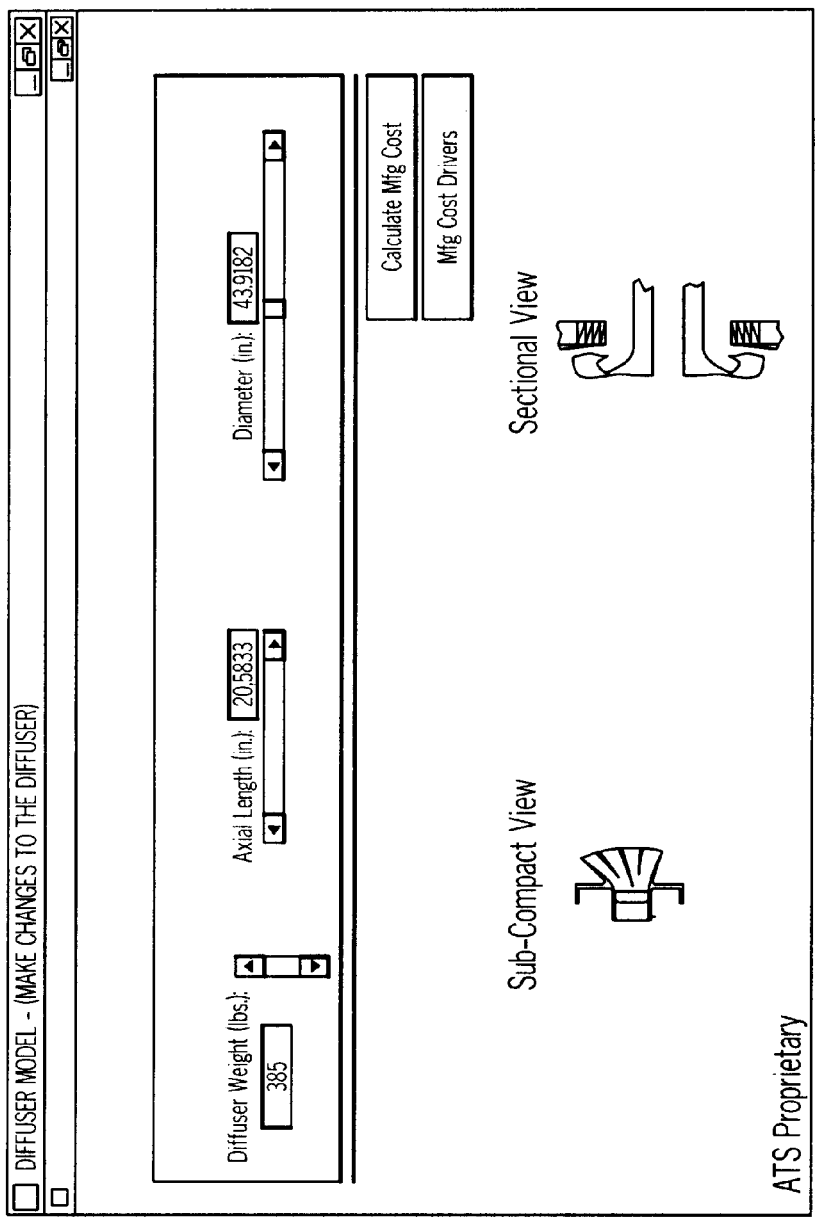

Upon selection of the Continue button, the next input level is presented to the user wherein values for physical parameters are specified. As illustrated in FIG. 20, axial length, outer diameter and/or weight are three examples of such parameters. Beyond these three physical parameters, the interface could include a variety of other physical parameters. Preferably, each parameter is restricted to values within certain ranges based on the domain established for the model.

Upon selection of the Calculate Mfg. Cost button, these parametric changes made by the user are passed to the various cost model algorithms. After the final manufacturing cost has been calculated, a user has the opportunity to print a cost detail report or view a simulation model of the manufacturing process, an example of which is illustrated in FIG. 21. The report identifies the design and configuration selected for estimation, lists the input parameters and gives a breakdown of the estimated cost.

Figure 22:
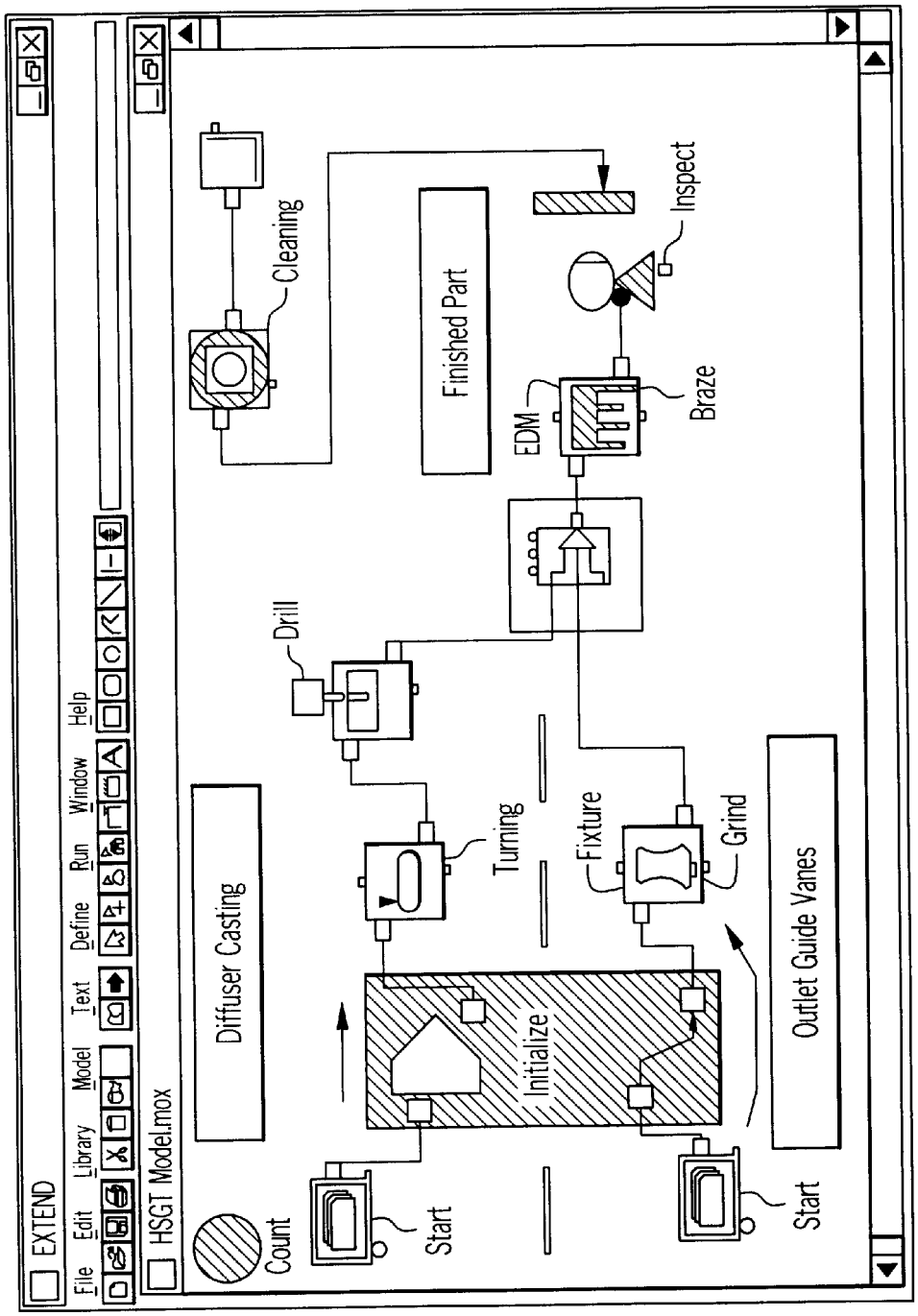
FIGS. 22–23 depicts screen shots from a manufacturing process flow simulation model.
Figure 23:
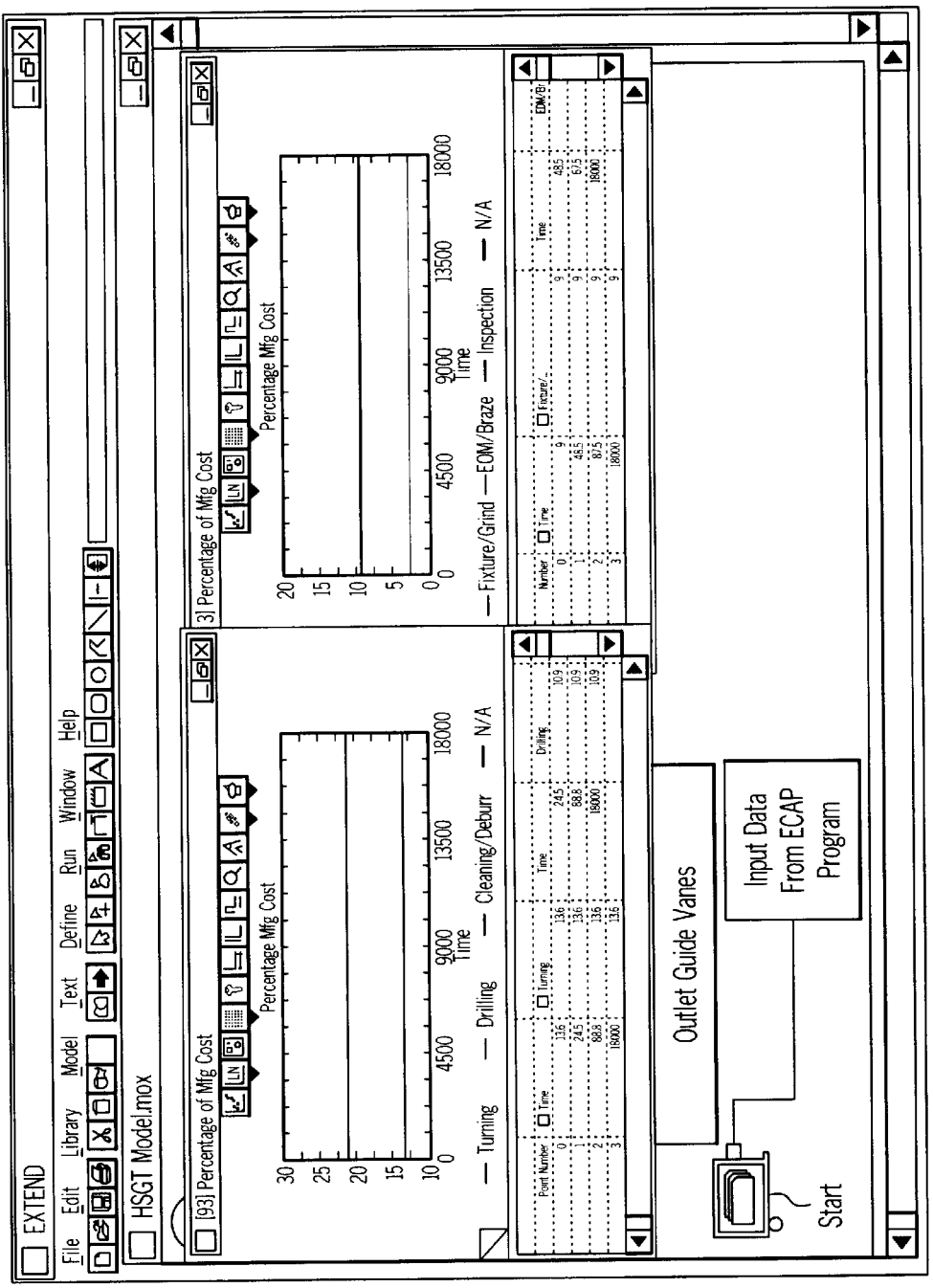

Upon selection of the Manufacturing Assembly button in FIG. 20, a simulation model is used to illustrate the production manufacturing process for producing this particular sub-component. FIG. 22 illustrates an example of such a production process. A manufacturing process flow simulation "MPFS" is created in a simulation software program, such as the Extend Performance Modeling system from Imagine That Inc., and is linked to the software engine 14. In the present example, the MPFS provides an illustration of the process flow for manufacturing the OGV/diffuser assembly. The simulation model highlights major cost drivers involved in the manufacturing process. It is especially suited to the preliminary design engineers who may not be familiar with the details of the manufacturing process for the part being designed. While the simulation model is running, input from engine 14 is read into the process blocks. A plot, such as that shown in FIG. 23, is then generated to show the percent contribution of each of the cost drivers identified in the process flow simulation model.

The engine 14 transfers the cost model 12 values directly into the simulation model. These are calculated values for the manufacturing cost of groups of operations as a percentage of the total estimated labor cost for the subject part. In the simulation model in FIG. 22, the individual operations are grouped into blocks representing the major cost drivers (e.g., turning, drilling, grind, etc.). These blocks are hierarchical in structure with underlying equations and logic for running calculations. As a result of the calculations, the percentages for the cost contribution of each of the major process cost drivers are determined and plotted, such as that illustrated in FIG. 23. After the simulation run is completed, closing the simulation model will cause the software to switch back to the user interface 12 for the engine 14.

The computer system 10 provides a unique software analysis tool for assessing the cost of conceptual designs using advanced materials and/or processes. This tool makes cost information available to a design engineer at a greater level of detail and earlier in the design cycle than ever before. Utilizing this information enables a designer to make decisions on alternative configurations, materials and even manufacturing processes.

The computer system 10 provides production costs based on the actual materials and designs envisioned for the product design. Furthermore, early producibility issues are addressed through real-time feedback on the proposed production process and identification of the cost drivers available in the MPFS module. For instance, using the computer system 10, we determined that the diffuser could be produced from two castings as a forward and aft section then joined by electron beam welding. In examining the casting process details, we projected that the integrated design could be cast in one piece with an acceptable yield and allowance for rework. However, the results of the cost analysis show that the integrated diffuser design is more expensive in each configuration than the two-piece design with a separate OGV ring. This is counterintuitive and in conflict with the general trend toward an integrated casting design for reducing manufacturing cost. This type of information is highly valuable, particularly to a preliminary/conceptual design engineer who is striving for a better understanding of the cost of his design and seeking to reduce production costs.

In conclusion, the method and system described above provides a tool for quickly estimating the production cost using advanced materials and/or processes. This approach provides the advantages of cost modeling and includes a variety of beneficial features. Cost estimates can be obtained quickly for a single part or a complete engine over a range of configurations, materials, and sizes. Input parameters are minimized to match the level of detail available to the preliminary designer. The estimates have a sound and a scientific basis. Vendor interaction further strengthens the fidelity of output. From the process-oriented analysis, the sensitivity of the cost to changes in design becomes inherent in the cost model. Process details and assumptions are captured in the reference parts that make up the database. Manufacturing process constraints and producibility considerations have been taken into consideration in development of the cost model.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

We claim:

1. A computer system, comprising:
    a) an input display for selecting one or more designs and one or more design parameters, wherein said parameters comprise one or more dimensions and part weight;
    b) one or more cost models operative to estimate manufacturing costs and comprising algorithms calculated from a plurality of discrete points, said cost models being based upon process-oriented manufacturing cost estimates for a plurality of designs utilizing advanced materials, wherein said cost estimates are based upon viable sequences of manufacturing operations for the designs and industry standard and process-specific cost information regarding each manufacturing operation to be performed in the sequence including information relating to the labor hours for each movement made by an operator to carry out each operation, wherein said cost estimates are not based upon company-specific information, wherein said cost estimates are categorized by families subdivided into categories having the same manufacturing process, and wherein said advanced materials comprise materials for which no historical manufacturing cost data is available for use of the materials in the designs;
    c) software programmed to receive selected designs and selected design parameters from the input display and pass the selected designs and selected design parameters to the cost models; and
    d) an output display operative to display the manufacturing costs estimated by the cost models for the selected designs and selected design parameters.

2. The computer system of claim 1, wherein the plurality of designs comprises a plurality of design configurations.

3. The computer system of claim 1, wherein the plurality of designs comprises a plurality of design variations.

4. A method for estimating the manufacturing costs for a part design, the method comprising the steps of:
    a) receiving a part design having advanced hardware, wherein said advanced hardware is hardware for which no historical manufacturing cost data is available for the part design; and
    b) estimating the manufacturing costs for the design using a process-oriented approach, wherein the cost estimate is based upon a viable sequence of manufacturing operations and industry standard data and process-specific cost information regarding each manufacturing operation.

5. A method for assessing the cost impact for a part design, comprising the steps of:
    a) estimating the manufacturing costs for a part design in accordance with claim 4;
    b) varying the part design configuration, dimensions, or materials to have a new part design, and repeating step (a) for the new part design; and
    c) repeating step (b) to determine the cost impact for varying the part design.

6. A computer readable medium, comprising software that when executed causes a computer to perform the method of claim 4.

7. A method for estimating the manufacturing costs for a part design, the method comprising the steps of:
    a) determining a cost model domain;
    b) generating a database of process-oriented manufacturing cost estimates based at least in part on:
        i) advanced material costs, wherein said advanced material is a material for which no historical manufacturing cost data is available for the part design;
        ii) a viable manufacturing sequence having a plurality of operations, and
        iii) the costs per operation based upon industry standard data and process-specific information regarding each operation to be performed in the manufacturing sequence;
    c) categorizing the database of cost estimates in accordance with the model domain so as to create categories of the database;
    d) dividing the categories of the database by manufacturing processes which represent process cost drivers;
    e) using regression analysis to build one or more cost model algorithms based on the database of cost estimates wherein cost is a function of parametric values, and wherein the cost model algorithms identify and quantify the process cost drivers;

f) determining one or more parametric values describing the part design;

g) inputting the parametric values for the part design to the one or more cost model algorithms;

h) estimating the manufacturing costs for the part design based on the results from the cost model algorithms; and i) presenting a manufacturing sequence for the part design.

8. A computer readable medium, comprising software that when executed causes a computer to perform the method of claim 7.

9. A method for generating a cost model for use in estimating manufacturing costs, the method comprising:

determining a model domain by establishing the range of possible variations to be encompassed, the variations including variations in part features and variations in materials, the materials including advanced materials, wherein said advanced materials are materials which lack historical manufacturing cost data for parts in the model domain;

generating a database of cost estimates by:
mapping the part features for each variation in the domain to their associated manufacturing processes; and
evaluating the labor hours required for each of the manufacturing processes for each variation using industry standard estimation data;

categorizing the cost estimates into families according to the type of part; and building cost model equations from the cost estimates, the cost model equations relating part features to cost.

10. The method as recited in claim 9, further comprising dividing the families by manufacturing processes that depend upon material type.

11. The method as recited in claim 9, wherein the cost estimates comprise discrete point estimates and wherein the cost model equations are built through statistical curve fitting of the discrete point estimates.

* * * * *